US012718532B2

(12) United States Patent
Townsend

(10) Patent No.: US 12,718,532 B2
(45) Date of Patent: Aug. 25, 2026

(54) IMAGE CLASSIFICATION METHOD AND APPARATUS, AND METHOD AND APPARATUS FOR IMPROVING TRAINING OF AN IMAGE CLASSIFIER

(71) Applicant: FUJITSU LIMITED, Kawasaki (JP)

(72) Inventor: Joseph Townsend, High Wycombe (GB)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 17/713,240

(22) Filed: Apr. 5, 2022

(65) Prior Publication Data

US 2023/0030987 A1 Feb. 2, 2023

(30) Foreign Application Priority Data

Aug. 2, 2021 (EP) .................................... 21189010

(51) Int. Cl.
*G06V 10/764* (2022.01)
*G06V 10/774* (2022.01)
*G06V 10/82* (2022.01)

(52) U.S. Cl.
CPC ........ *G06V 10/7747* (2022.01); *G06V 10/764* (2022.01); *G06V 10/82* (2022.01)

(58) Field of Classification Search
None
See application file for complete search history.

(56) References Cited

U.S. PATENT DOCUMENTS

2005/0162515 A1 7/2005 Venetianer et al.
2019/0340416 A1 11/2019 Cao
(Continued)

FOREIGN PATENT DOCUMENTS

EP 3291146 A1 3/2018
JP 2008538665 A 10/2008
(Continued)

OTHER PUBLICATIONS

Gutierrez-Mondragon, Mario A., et al. "Obstruction level detection of sewer videos using convolutional neural networks." arXiv preprint arXiv:2002.01284 (2020). (Year: 2020).*
(Continued)

*Primary Examiner* — Sean M Conner
(74) *Attorney, Agent, or Firm* — XSENSUS LLP

(57) ABSTRACT

An image classification method comprises: extracting a logic program from a CNN, trained to classify features in images, which is a symbolic approximation of outputs of kernels at an extraction layer of the CNN; deriving kernel-based classification rules; forward-propagating pairs of feature-labeled images through the logic program to obtain kernel activations at the extraction layer for features in the images, where the scene in one of the pair contains a particular feature and the other is of the same scene without the feature; and calculating the correlation between each kernel in the logic program and each feature in the feature-labeled images using the kernel activations and the features associated with the feature-labeled images, assigning to each kernel in the logic program the label of the feature with which the kernel has the highest correlation, and applying the assigned kernel labels to the kernels in the rules to obtain kernel-labeled rules.

14 Claims, 17 Drawing Sheets

(56) References Cited

U.S. PATENT DOCUMENTS

| | | | | |
|---|---|---|---|---|
| 2019/0370587 | A1* | 12/2019 | Burachas | G06T 11/60 |
| 2019/0370697 | A1* | 12/2019 | Ramachandra | G06F 18/285 |
| 2020/0265301 | A1* | 8/2020 | Burger | G06N 3/08 |
| 2021/0097382 | A1* | 4/2021 | Mathews | H04N 21/44008 |
| 2021/0232915 | A1* | 7/2021 | Dalli | G06N 3/049 |
| 2022/0292618 | A1* | 9/2022 | DeSantola | G06T 7/11 |

FOREIGN PATENT DOCUMENTS

| | | |
|---|---|---|
| JP | 2009080557 A | 4/2009 |
| JP | 2011-170789 A | 9/2011 |
| WO | 2006088618 A2 | 8/2006 |

OTHER PUBLICATIONS

Zeiler, M. D. “Visualizing and Understanding Convolutional Networks.” European conference on computer vision/arXiv. vol. 1311. 2014. (Year: 2014).*

Townsend et al: “ERIC: Extracting Relations Inferred from Convolutions”, 15th Asian Conference on Computer Vision, arXiv:2010.09452v1, Oct. 19, 2020, pp. 1-17.

Taylor, et al., “Rule Extraction as a Formal Method for the Verification and Validation of Neural Networks”, Neural Networks, 2005. Proceedings IEEE International Joint Conference on Montreal, vol. 5, Jul. 31, 2005, pp. 2915-2920.

Zintgraf et al., “Visualizing deep neural network decisions: Prediction difference analysis”, Published as a conference paper at ICLR 2017, arXiv:1702.04595v1, Feb. 15, 2017, pp. 1-12.

Chen et al., “This Looks Like That: Deep Learning for Interpretable Image Recognition”, 33rd Conference on Neural Information Processing Systems (NeurIPS 2019), arXiv:1806.10574v5, Dec. 28, 2019, pp. 1-12.

Zhang et al., “Interpreting CNNs via Decision Trees”, arXiv:1802.00121v2, Feb. 25, 2019, pp. 1-10.

Zhang et al., “Interpreting CNN Knowledge via an Explanatory Graph” In: Thirty-Second AAAI Conference on Artificial Intelligence, arXiv:1708.01785v3, Nov. 22, 2017, 11 pages.

Fong et al., “Interpretable Explanations of Black Boxes by Meaningful Perturbation”, In: Proceedings of the IEEE International Conference on Computer Vision, 2017, pp. 3429-3437.

Zhang et al., “Interpretable Convolutional Neural Networks” In: Proceedings of the IEEE Conference on Computer Vision and Pattern Recognition, 2018, pp. 8827-8836.

Zhang et al., “Growing Interpretable Part Graphs on ConvNets via Multi-Shot Learning”, In: Thirty-First AAAI Conference on Artificial Intelligence, 2017, pp. 2898-2906.

Agarwal et al., “Explaining image classifiers by removing input features using generative models”, In Proceedings of the Asian Conference on Computer Vision, Available Online At: https://openaccess.thecvf.com/content/ACCV2020/papers/Agarwal_Explaining_image_classifiers_by_removing_input_features_using_generative_models_ACCV_2020_paper.pdf, 2020, pp. 1-17.

Extended European Search Report from EP 21189010.8, Jan. 31, 2022, 7 pages.

Japanese Office Action issued Oct. 21, 2025 in corresponding Japanese Patent Application No. 2022-103214, 13 pages.

* cited by examiner

| | Raw annotation | | | | | | | | Presence matrix | | | | | | | | Comment |
|---|---|---|---|---|---|---|---|---|---|---|---|---|---|---|---|---|---|
| t | Car | Cloud | Door | Person | Sign | Tree | Van | Window | Car | Cloud | Door | Person | Sign | Tree | Van | Window | |
| 0 | | | 1 | | | 1 | | 1 | 0 | 0 | 1 | 0 | 0 | 1 | 0 | 1 | Door, tree and window(s) already in view |
| 1 | | | | 1 | | | | | 0 | 0 | 1 | 1 | 0 | 1 | 0 | 1 | Person enters scene |
| 2 | | | | | | | | | 0 | 0 | 1 | 1 | 0 | 1 | 0 | 1 | |
| 3 | | | | | | | 1 | | 0 | 0 | 1 | 1 | 0 | 1 | 1 | 1 | Van enters scene |
| 4 | | | | | | -1 | | | 0 | 0 | 1 | 1 | 0 | 0 | 1 | 1 | Van occludes tree |
| 5 | | | | -1 | | | | | 0 | 0 | 1 | 0 | 0 | 0 | 1 | 1 | Person leaves scene |
| 6 | | | | | | 1 | | | 0 | 0 | 1 | 0 | 0 | 1 | 1 | 1 | Tree no longer occluded |
| 7 | | | | | | | -1 | | 0 | 0 | 1 | 0 | 0 | 1 | 0 | 1 | Van exits scene |

Table 1

Figure 9

| | Presence matrix | | | | | | | | | Kernel activations | | | | | | | |
|---|---|---|---|---|---|---|---|---|---|---|---|---|---|---|---|---|---|
| t | Car | Cloud | Door | Person | Sign | Tree | Van | Window | | A | B | C | E | F | G | J | K |
| 0 | 0 | 0 | 1 | 0 | 0 | 1 | 0 | 1 | | 0 | 0 | 1 | 1 | 0 | 0 | 1 | 0 |
| 1 | 0 | 0 | 1 | 1 | 0 | 1 | 0 | 1 | | 0 | 0 | 1 | 1 | 0 | 1 | 1 | 0 |
| 2 | 0 | 0 | 1 | 1 | 0 | 1 | 0 | 1 | | 0 | 0 | 1 | 1 | 0 | 1 | 1 | 0 |
| 3 | 0 | 0 | 1 | 1 | 0 | 1 | 1 | 1 | | 1 | 0 | 1 | 1 | 0 | 1 | 1 | 0 |
| 4 | 0 | 0 | 1 | 1 | 0 | 0 | 1 | 1 | | 1 | 0 | 1 | 0 | 0 | 1 | 1 | 0 |
| 5 | 0 | 0 | 1 | 0 | 0 | 0 | 1 | 1 | | 1 | 0 | 1 | 0 | 0 | 0 | 1 | 0 |
| 6 | 0 | 0 | 1 | 0 | 0 | 1 | 1 | 1 | | 1 | 0 | 1 | 1 | 0 | 0 | 1 | 0 |
| 7 | 0 | 0 | 1 | 0 | 0 | 1 | 0 | 1 | | 0 | 0 | 1 | 1 | 0 | 0 | 1 | 0 |

Table 2

Figure 10

| | Presence matrix (area of feature's segmented region) | | | | | | | | | Kernel activations | | | | | | | |
|---|---|---|---|---|---|---|---|---|---|---|---|---|---|---|---|---|---|
| t | Car (1) | Cloud (2) | Door (3) | Person (4) | Sign (5) | Tree (6) | Van (7) | Window (8) | | A | B | C | E | F | G | J | K |
| 0 | 0 | 0 | 10 | 0 | 0 | 15 | 0 | 20 | | 0 | 0 | 0.8 | 0.6 | 0.2 | 0.4 | 0.7 | 0.4 |
| 1 | 0 | 0 | 7 | 10 | 0 | 15 | 0 | 20 | | 0 | 0 | 0.8 | 0.6 | 0.2 | 0.7 | 0.65 | 0.4 |
| 2 | 0 | 0 | 9 | 10 | 0 | 15 | 0 | 20 | | 0 | 0 | 0.8 | 0.6 | 0.2 | 0.7 | 0.7 | 0.4 |
| 3 | 0 | 0 | 10 | 10 | 0 | 14 | 15 | 20 | | 1 | 0 | 0.8 | 0.6 | 0.2 | 0.7 | 0.7 | 0.4 |
| 4 | 0 | 0 | 10 | 4 | 0 | 0 | 40 | 20 | | 1 | 0 | 0.8 | 0.3 | 0.2 | 0.6 | 0.7 | 0.4 |
| 5 | 0 | 0 | 5 | 0 | 0 | 1 | 100 | 20 | | 1 | 0 | 0.8 | 0.3 | 0.2 | 0.4 | 0.65 | 0.4 |
| 6 | 0 | 0 | 10 | 0 | 0 | 15 | 35 | 15 | | 1 | 0 | 0.8 | 0.6 | 0.2 | 0.4 | 0.7 | 0.4 |
| 7 | 0 | 0 | 10 | 0 | 0 | 15 | 0 | 20 | | 0 | 0 | 0.8 | 0.6 | 0.2 | 0.4 | 0.7 | 0.4 |

Table 3

Figure 12

| | | Feature | | | | | | | |
|---|---|---|---|---|---|---|---|---|---|
| | | Car | Cloud | Door | Person | Sign | Tree | Van | Window |
| Kernel | A | 0.23 | 0.19 | | -0.01 | | -0.57 | **0.99** | |
| | B | **0.93** | 0.24 | | 0.21 | | -0.05 | | |
| | C | 0.23 | 0.02 | -0.21 | 0.04 | | 0.31 | | **0.96** |
| | E | 0.01 | 0.13 | | -0.01 | | **0.95** | -0.57 | |
| | F | -0.32 | **0.91** | | -0.12 | | 0.35 | | |
| | G | -0.01 | 0.15 | | **0.98** | | 0.03 | 0 | |
| | J | 0.11 | -0.41 | **0.92** | 0.34 | | -0.23 | | |
| | K | 0.05 | 0.02 | | 0.25 | **0.97** | 0.01 | | |

Table 4

Figure 13

| Rule ID | M' | M" |
|---|---|---|
| 1. | ¬F ∧ E → country | ¬Cloud ∧ Tree → country |
| 2. | F ∧ E ∧ ¬K → country | Cloud ∧ Tree ∧ ¬Sign → country |
| 3. | A ∧ ¬J ∧ ¬C → highway | Van ∧ ¬Door ∧ ¬Window → highway |
| 4. | B ∧ ¬J ∧ ¬C → highway | Car ∧ ¬Door ∧ ¬Window → highway |
| 5. | G ∧ E → street | Person ∧ Tree → street |
| 6. | J ∧ C → street | Door ∧ Window → street |

Table 5

Figure 14

IMAGE CLASSIFICATION METHOD AND APPARATUS, AND METHOD AND APPARATUS FOR IMPROVING TRAINING OF AN IMAGE CLASSIFIER

CROSS-REFERENCE TO RELATED APPLICATION

This application claims priority from EP 21189010.8, filed on Aug. 2, 2021, the contents of which are incorporated by reference herein in its entirety Embodiments relate to an image classification method and apparatus, and a method and apparatus for improving training of an image classifier.

The field of neural-symbolic integration concerns the relationship between symbolic models, for example propositional logic programs, and neural networks. In other words, it concerns explainable artificial intelligence with respect to neural networks. This body of work includes the tasks of translating knowledge from one form of representation to the other, e.g. translating logic programs into neural networks that may be trained inductively by observation of training samples; or translating the weights of trained neural networks into logic programs so that the decisions made by neural networks may be more easily understood by humans. Rules will generally describe how the relationships between individual features (represented by individual neurons) contribute to individual class activations or to the observation of other features as evidenced by the activations of corresponding neurons.

In more recent years convolutional neural networks (CNNs) have become a popular way to perform image classification. Most efforts to explain the behaviour of CNNs have involved visualising regions of the input image that are most important or relevant to a given classification. While useful, some limitations are:

- Such explanations are only local in that they explain individual samples and not the model as a whole (“global” explanations).
- They do not provide much insight into the relationship between features as earlier neural-symbolic models do.
- They do not directly provide much insight into the inner workings of the CNNs With respect to the last point, some methods allow one to visualise what an individual kernel responds to. A simple way to do this is to visualise (i.e. create an image corresponding to) the output of a kernel and use this to generate a mask over the original image, but more sophisticated methods will backpropagate some signal from the kernel, through the weights and activations that led to it, and back to the input image. While these allow decomposition of the model for a better understanding of its inner workings, these methods still do not provide insight into the interaction between features represented by other kernels.

Methods exist which describe CNN classification decisions in the form of graphs or trees. These do describe the relationships between different features. However, these do not allow for the expression of negated symbols (e.g. ¬A as opposed to A). A way of training kernels to be interpretable has also been proposed. However, the symbolic concept represented by a kernel using this method may belong to only one class. Also, it assumes that the CNN has been trained in a specific way. Another method for explaining CNN behaviour learns a prototype layer, which represents inputs in terms of similar components to training inputs, where each component is represented by a specific kernel in the prototype layer. However, this again assumes a specific training method and a specific type of layer. There may however be situations in which one may want to explain any CNN, not only those with specific architectures and/or that have been trained in any specific way.

In EP3291146 a method is proposed to extract logic programs from convolutional neural networks so that those logic programs may be regarded as explaining the behaviour of the corresponding CNNs. This overcomes the problems listed in the previous paragraph; i.e. it allows for negation of symbols, for symbols represented by kernels to be associated with multiple classes, and does not assume any specific training method or architecture beyond what is common for CNNs (though such training methods may still improve accuracy).

As shown in FIG. 1 of the accompanying drawings, in this method each kernel in the CNN is quantised by first mapping its output to a single value, regarded as that kernel's activation value, by applying an L1 or L2 norm to its activation map and then applying a binary threshold to that activationAs shown in Figure.

FIG. 2 of the accompanying drawings shows an example CNN M and corresponding extracted logic program M', extracted using the aforementioned method. A logic program to approximate the behaviour of the CNN M is extracted by first applying the quantisation function to all kernels to participate in the program, and then applying a decision tree extractor to each binarised kernel and its inputs to discover logical rules which describe the conditions for which each of those kernels ‘activate’. The aggregation of these rules constitutes the explanation of the overall CNN. In FIG. 2, a program is only extracted to describe the third layer (“the extraction layer”), but multiple layers could be included. Any convolutional layers preceding the extraction layer remain in M', so that kernel activations may be obtained for quantisation into binary truths, as in FIG. 1.

However, extracted rules lack meaning without labels assigned to the kernels, which remains an open problem. The problem of labelling convolutional kernels is a CNN-specific version of the more general ‘symbol grounding problem’—the question of the origin of the meaning of a symbol.

It has been proposed that labels could be assigned by visualising a kernel's output and providing this visualisation as an input to a second classifier trained on a more fine-grained dataset (henceforth referred to as a “support” dataset) in order to attribute those class labels to those kernels. This is illustrated in FIG. 3 of the accompanying drawings. The visualisation method may be the direct method, or a more sophisticated visualisation method.

Among the more sophisticated visualisation methods are perturbation-based methods, which deduce the importance of a feature based on the effect on classifier output when that feature is added, removed or modified. For example, an image may be modified by cropping out a region of the image, and if the network changes its decision with respect to the class of the input, then that region is regarded as important. Otherwise, it is not.

Recently, a method has been proposed which performs perturbation through inpainting. Inpainting is a method often used to automate the generation of training data. A model is designed and/or trained to paint a feature in, or paint a feature out of, an image and thus be used to generate a dataset for the purpose of training another model to detect the presence or absence of that feature. However, in this case, it is used not (necessarily) for training, but to determine the importance of a feature with respect to a trained network's decision process. This allows for more ‘realistic’ perturbations than simply cropping out regions of the image.

The previously proposed method for assigning labels to kernels using a support dataset is computationally expensive, as both the visualisation method and the kernel classifier must be applied once for each image of the support dataset and for each kernel for which a label is to be assigned. This is especially expensive for the more sophisticated visualisation methods, which back-propagate some signal from the kernel to be visualised back onto the input image.

Furthermore, inpainting is an expensive process if it is not needed. For example, it is only used to generate training data if an adequate training set has not been acquired. The same is true of using it as a means of perturbation-based feature importance calculation; it would be better to use real photographic datasets that represent the presence or absence of features in otherwise unchanging scenes, if such data were available.

It is therefore desirable to be able to assign meaningful labels to kernels in extracted rules more efficiently.

According to an embodiment of a first aspect there is provided a computer-implemented image classification method comprising: obtaining a convolutional neural network, CNN, trained to classify features in images using a training image dataset; extracting a logic program from the CNN, the logic program being a symbolic approximation of outputs of kernels at an extraction layer of the CNN, and deriving from the logic program rules which use the kernels to explain the classification of images by the CNN; obtaining a feature-labeled image dataset, and a record of each feature associated with each feature-labeled image in the dataset, where the images in the dataset comprise pairs of feature-labeled images, one feature-labeled image of the pair being of a scene containing a feature and the other feature-labeled image of the pair being of the same scene without the feature; forward-propagating the pairs of feature-labeled images through the logic program to obtain kernel activations at the extraction layer for features in the images; and calculating a correlation between each kernel in the logic program and each feature in the feature-labeled images using the obtained kernel activations and the features associated with the feature-labeled images, assigning to each kernel in the logic program the label of the feature with which the kernel has the highest correlation, and applying the assigned kernel labels to the kernels in the derived rules to obtain kernel-labeled rules.

Embodiments provide a new approach to assigning symbolic labels to kernels in convolutional neural networks (CNNs), so that those labeled kernels may be manipulated by a logic program. In contrast to the previous approach which proposed classifying the output of individual kernels for each image from a labeled ‘support dataset’ set aside for this purpose, performance is improved by only requiring the kernel classifier to be applied once per kernel after all support images have been processed.

In particular, in both the above-mentioned prior art method and the present embodiments, kernel labelling may involve forward propagating a labeled training image from the support dataset and quantising kernel outputs. However, in the previously-proposed method a classification must be applied to each kernel and for each support image, whereas in a method according to an embodiment it is possible only to annotate a table to identify which kernel was activated in that image. After all support images have been processed, classification only needs to be performed once per kernel by selecting as the label a tag assigned to the image (for example, during manual labelling) that correlates most strongly with that kernel’s activation. This is based on the assumption that kernels for which activation drastically changes between the two images may be argued to correspond to that tag/feature. To realise this the network is presented with at least two versions of an image from the support dataset during the labelling process, one with and one without a given tagged feature but otherwise identical.

Thus, the complexity of the previously proposed approach to labelling kernels is reduced, as it is no longer necessary to apply a classifier once per kernel per image, which in turn reduces demand on computational resource.

According to an embodiment of a second aspect there is provided a computer-implemented method of improving training of an image classifier, the method comprising: for a convolutional neural network, CNN, trained to classify features in images, obtaining kernel-labeled rules which have been derived from the CNN using the method embodying the first aspect; for at least one image not forming part of the training image dataset used to train the CNN or the feature-labeled image dataset used to derive the kernel-labeled rules, obtaining a classification of the at least one image determined by the CNN, which classification has been assessed as being incorrect, and identifying a rule of the kernel-labeled rules which is associated with the incorrect classification; and causing the CNN to be retrained using further training images containing features corresponding to the kernel labels of the rule associated with the incorrect classification.

According to an embodiment of a third aspect there is provided a computer program which, when run on a computer, causes that computer to carry out a method embodying the first and/or second aspect.

According to an embodiment of a fourth aspect there is provided image classification apparatus comprising: at least one memory to store: (a) a convolutional neural network, CNN, trained to classify features in images using a training image dataset, and (b) a feature-labeled image dataset and a record of each feature associated with each feature-labeled image in the dataset, where the images in the dataset comprise pairs of feature-labeled images, one feature-labeled image of the pair being of a scene containing a feature and the other feature-labeled image of the pair being of the same scene without the feature; and at least one processor, connected to the memory, to: extract a logic program from the CNN stored in the memory, the logic program being a symbolic approximation of outputs of kernels at an extraction layer of the CNN, and derive from the logic program rules which use the kernels to explain the classification of images by the CNN; forward-propagate the pairs of feature-labeled images from the feature-labeled dataset stored in the memory through the logic program to obtain kernel activations at the extraction layer for features in the images; and calculate a correlation between each kernel in the logic program and each feature in the feature-labeled images using the obtained kernel activations and the features associated with the feature-labeled images, assign to each kernel in the logic program the label of the feature with which the kernel has the highest correlation, and apply the assigned kernel labels to the kernels in the derived rules to obtain kernel-labeled rules.

According to an embodiment of a fifth aspect there is provided apparatus to improve training of an image classifier, the apparatus comprising: at least one memory storing: for a convolutional neural network, CNN, trained to classify features in images, kernel-labeled rules which have been derived from the CNN using apparatus embodying the fourth aspect or a method embodying the first aspect; and for at least one image not forming part of the training image dataset used to train the CNN or the feature-labeled image dataset used to derive the kernel-labeled rules, a classification of the at least one image determined by the CNN, which classification has been assessed as being incorrect; and at least one processor, connected to the memory, to: identify a rule of the kernel-labeled rules which is associated with the incorrect classification; and cause the CNN to be retrained using further training images containing features corresponding to the kernel labels of the rule associated with the incorrect classification.

In a method embodying the first aspect or apparatus embodying the fourth aspect, images in the feature-labeled image dataset may comprise still frames from at least one video recording. The at least one video recording may have been captured by a closed circuit television (CCTV) camera.

The manual effort required to label the support dataset may be reduced by exploiting the fact that frames from still video/CCTV cameras capture the differences between the presence, absence or change of entities in the camera view when the background is stationary, and the fact that kernel activations will differ accordingly. The use of videos from still cameras is a much more efficient way of generating scene perturbations, because the perturbations are natural and do not require objects to be manually placed. For example, to identify kernels which relate to cars it would be laborious to have to drive cars in and out of camera shot to obtain 'with' and 'without' images. However, CCTV in a car park observes cars arriving and leaving all the time.

By taking training frames from static video cameras as the support dataset, three shortcomings may be overcome:

- Labelling frames from such videos is a less laborious task than labelling a number of images equal to the total number of frames across all the videos, as one need only label instances of features appearing or disappearing, i.e. frames only require annotating when objects enter or exit a scene, as opposed to manually tagging individual frames.
- The lack of realism of naïve perturbations, such as cropping out or blurring tagged objects, is avoided.
- Reducing computational load required by automatic inpainting methods for adding or removing objects—the need to consume extra processing for inpainting methods to artificially add or remove tagged objects is avoided, because objects in videos enter and exit scenes of their own accord.

That said, a user may still use still images and/or artificially perturbed images or frames in embodiments if they so wish.

The use of images from still cameras to improve performance may make it especially relevant to anyone who works with such hardware. For example, embodiments may be applied to obtain explainable classifications of CCTV footage taken at airports, on transport networks and the like.

In a method embodying the first aspect or apparatus embodying the fourth aspect, the feature-labeled image dataset may comprise images annotated for semantic segmentation The record of each feature associated with each feature-labeled image in the dataset may comprise a value corresponding to a total area occupied by the feature in the image.

Reference will now be made, by way of example, to the accompanying drawings, in which:

FIG. 9 is a table illustrating a completed presence matrix corresponding to the frames of FIG. 8;

FIG. 10 is a table illustrating a completed kernel activation matrix corresponding to the frames of FIG. 8;

FIG. 12 is a table illustrating a completed presence matrix and a completed kernel activation matrix corresponding to the frames of FIG. 11;

FIG. 13 is a table of feature-kernel correlation values corresponding to the frames of FIGS. 8 and 11;

FIG. 14 is a table of extracted rules interpreted according to the process of FIG. 7;

In an embodiment described below, initial training of a CNN is carried out and a representative logic program is extracted, as in the prior art. To label the atoms in the logic program, their corresponding kernels are isolated, and changes in the activations of those kernels as images from a support dataset are classified sequentially by the CNN are observed. For example, a binary flip of a kernel's quantised activation as an object enters a scene, and again when it exits the scene, is regarded as evidence that the kernel is activated in response to presence of that object.

Figure 4:
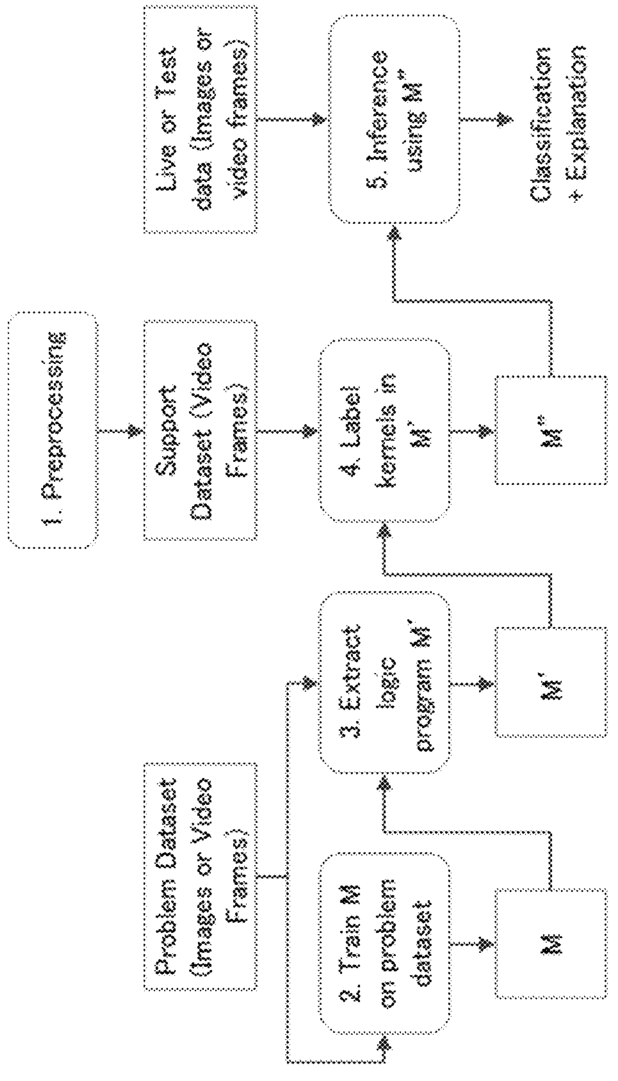
FIG. 4 is a flowchart of a method according to an embodiment.

A high-level overview of the overall method is given in FIG. 4, which is described below.

1. Datasets and Pre-Processing

In Step 1 a problem dataset for training the CNN is obtained.

Obtaining Problem Dataset

The problem dataset is the original classification task the CNN to be explained is trained to do. Thus, the problem dataset is a set of images plus their corresponding class labels, all partitioned into training, validation and test partitions. These images may be video frames.

In this example, at Step 1 a support dataset may also be obtained. Alternatively, this may be obtained at any time before Step 3.

Obtaining Support Dataset

Figure 5:
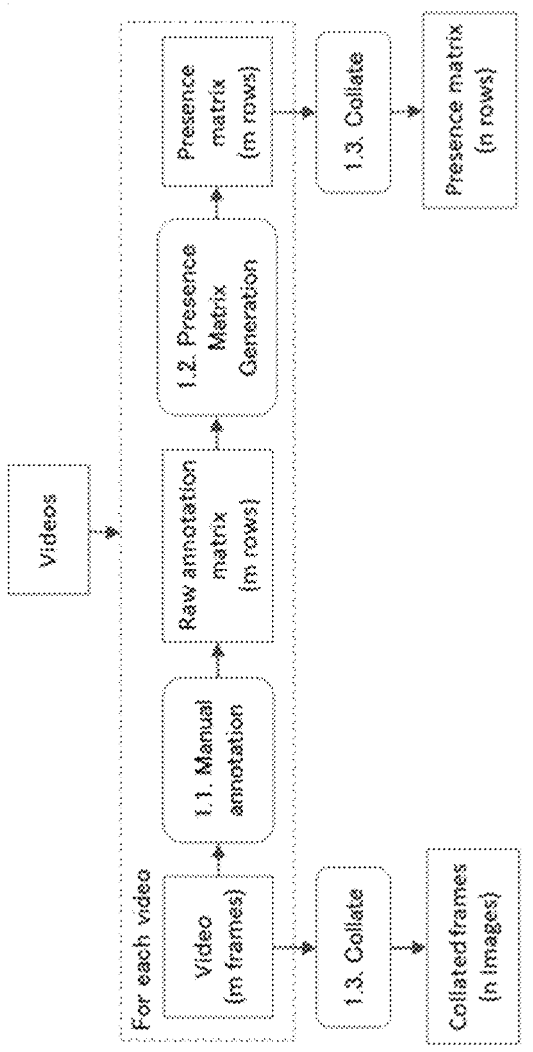
FIG. 5 is a flowchart of a pre-processing method for use with a method according to an embodiment.

FIG. 5 illustrates a pre-processing pipeline for the support dataset.

The support dataset will be used for the purpose of labelling kernels. It may be the same as the problem dataset, if the problem dataset meets the criteria for a support dataset as described in the following paragraph.

Figure 8:
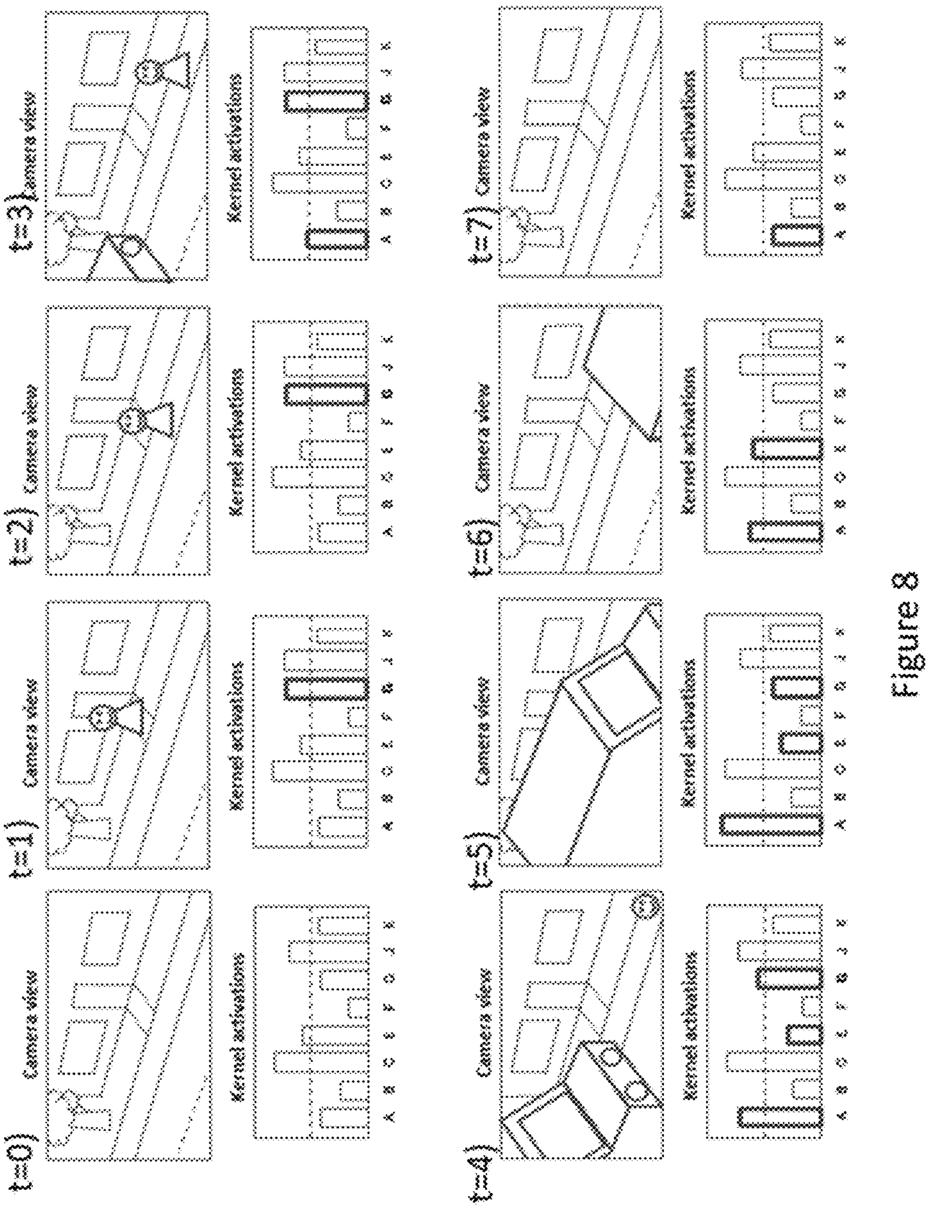
FIG. 8 is a diagram representing a series of still CCTV frames and associated kernel activations.

For each instance of a feature, the support dataset must have at least an instance of the scene both with and without that feature, with all other features in the image otherwise remaining the same. Thus, if the number of object instances is N, then the support dataset should ideally have at minimum 2*N images, plus a "presence matrix" which identifies which images correspond to the presence or absence of the feature. Ways of obtaining such data include (but are not limited to):

- Take frames from a still video camera in which objects enter/exit the scene (assumed method henceforth).
- Taking a photograph of an object in a scene, removing the object and then taking another photo.
- For still images, use in-painting to add or remove objects There are multiple options for completing the presence matrix for the support dataset, if a completed presence matrix has not already been provided. These include but are not limited to:

- As shown in Table 1 (FIG. 9) with respect to the example in FIG. 8, marking the appearance or disappearance of features of interest with 1 or −1 respectively on the frames in which these corresponding transitions occur (Step 1.1. of FIG. 5). These intervals are automatically filled with 1's in the presence matrix (Step 1.2. of FIG. 5). This is the assumed method used for examples described later in this document.
- If the dataset has already been annotated for semantic segmentation (whether video or still images), a 1 is added to the presence matrix for each object (i.e. feature) present in each frame. Alternatively, a value corresponding to the total area taken up by each object (feature) may be input (Table 3 (FIG. 12), with reference to FIG. 9).

Figure 6:
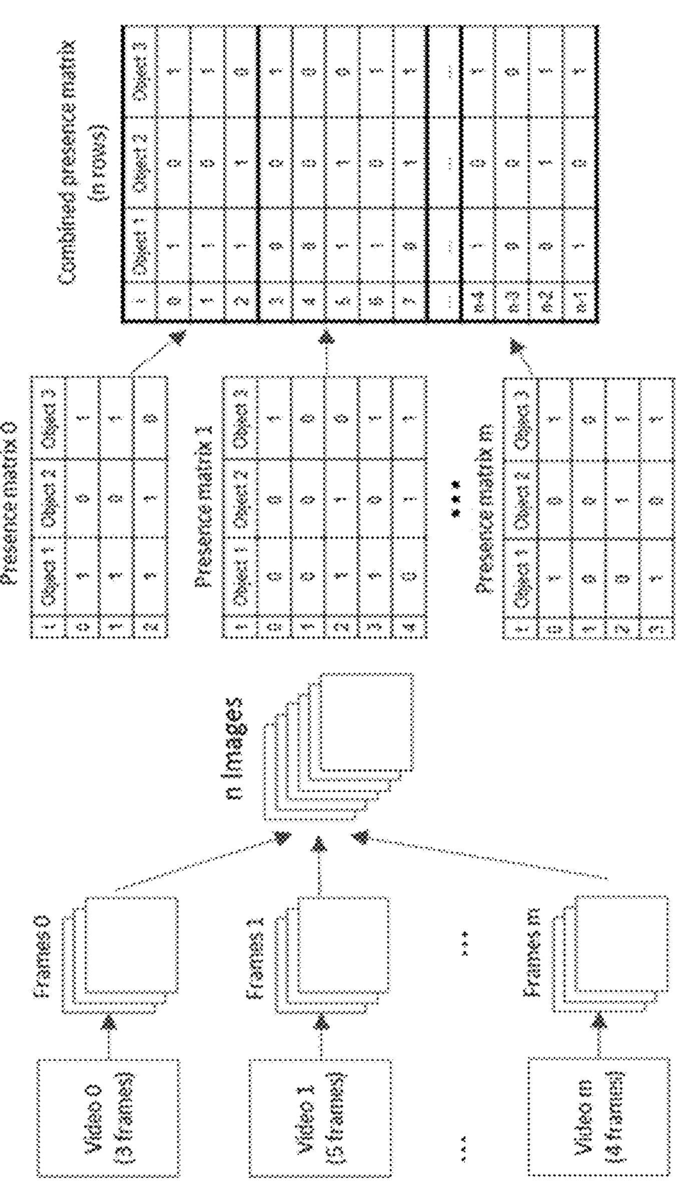
FIG. 6 is a diagram for use in explaining the pre-processing method of FIG. 5.

Frames and corresponding presence matrices may be generated from multiple videos, in which case they are combined into a single dataset of n images/rows corresponding to one set of images and one presence matrix, as shown in FIG. 6 (Step 1.3. of FIG. 5).

2. Initial Training CNN

At Step 2, the CNN M is trained on the problem dataset in the usual way.

3. Knowledge Extraction

Figure 1:
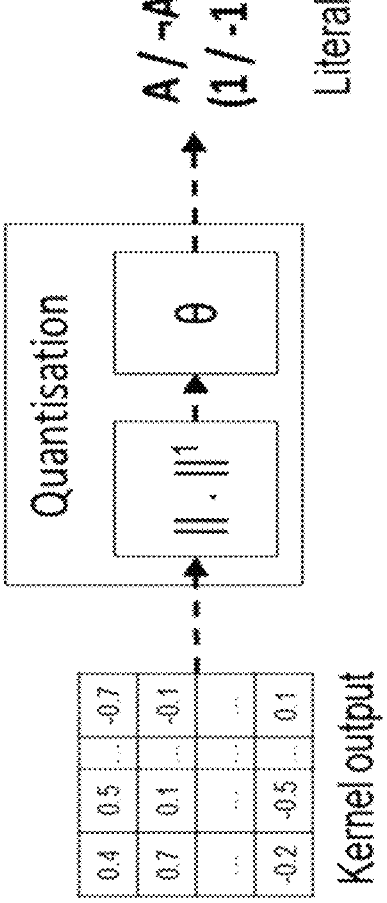
FIG. 1 (described above) is a diagram for use in explaining quantisation of each kernel in a CNN according to a prior art method.
Figure 2:
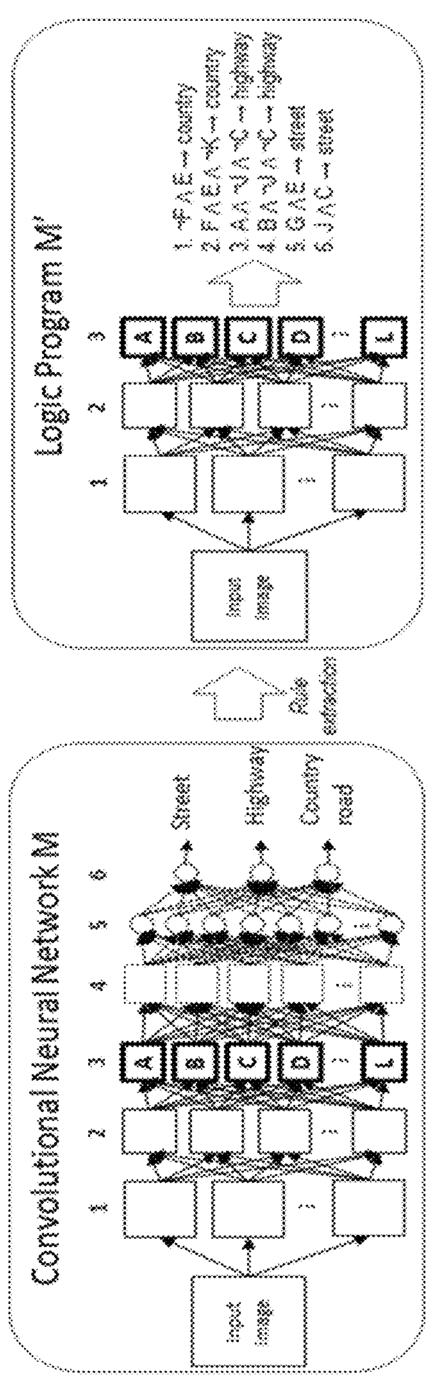
FIG. 2 (described above) is a diagram for use in explaining extraction of a logic program from the CNN according to the prior art method.
Figure 3:
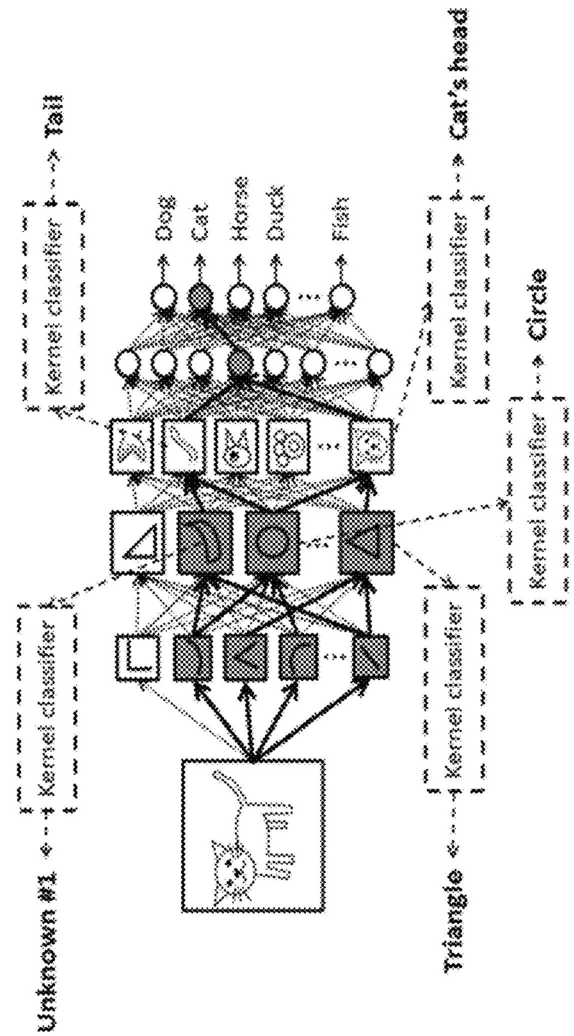
FIG. 3 (described above) is a diagram for use in explaining a prior art method of assigning labels to kernels of a CNN.

At Step 3, a logic program M', which is a quantised/symbolic approximation of M, is extracted from M, for example according to one of the above-described extraction methods (e.g. as shown in FIG. 2) or any method which produces quantised approximations of kernel outputs. Rules for explaining the CNN's classifications are derived from the logic program. However, the derived rules do not have labels assigned to the kernels.

4. Kernel Labelling

At Step 4 kernels in the symbolic approximation M' are labeled. An overview of the kernel labelling process carried out at Step 4 is shown in FIG. 7.

Figure 7:
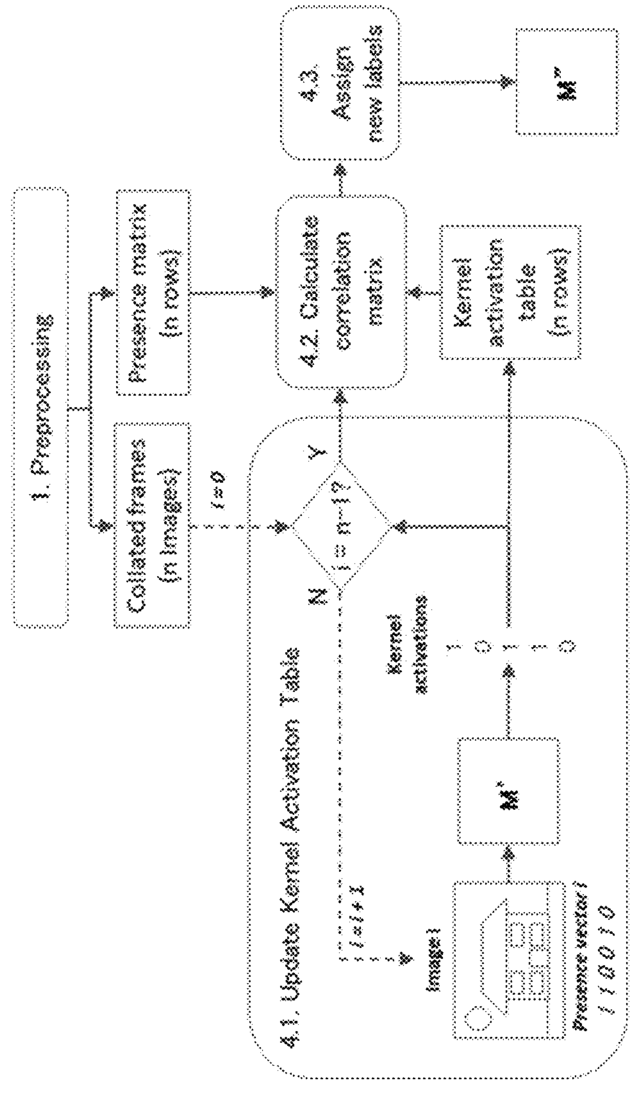
FIG. 7 is a flowchart of a process used in a method according to an embodiment.

At Step 4.1 of FIG. 7, each support image is forward-propagated though M' to obtain the quantised kernel activations at the extraction layer, and those quantisations are recorded as in Table 2 (FIG. 10), in line with the presence matrix values generated earlier (Table 1 (FIG. 9)).

Alternatively, if segmentation annotations are available as mentioned above, the presence matrix may be filled with the total area taken up by segments of each class, and the kernel activation matrix filled with the activation values before the thresholding part of quantisation (i.e. after L1 or L2 norms have been obtained, but before thresholding). Values for the current example are shown in Table 3 (FIG. 12), based on segments shown in FIG. 11.

Note that some kernels in the original CNN M may not have corresponding literals in the symbolic approximation M'. Therefore, there is no need to generate labels for these literals/kernels.

Then, at Step 4.2, the correlation between each observed feature and each kernel is calculated, for example according to the Phi Coefficient, Spearman's rank correlation coefficient, the Kendall rank correlation coefficient or some other known method of calculating the correlation between two binary variables. Features and kernels which show no change with respect to presence or activation may be excluded from this process.

At Step 4.3 each kernel is assigned the label of the feature for which it yields the highest correlation. The symbolic approximation M' plus the newly assigned labels is now referred to as M".

In the case of segmented image datasets, a label may be assigned to a kernel based on the correlation between the kernel activation strength and the area of a segmented region pertaining to a class with the same label, provided the correlation metric used in this case may be applied to continuous variables (e.g. Pearson or Spearman's).

The rules of M' may therefore now be translated into terms which use the assigned kernel labels.

5. Inference

At Step 5, inference is carried out. If the symbolic approximation M' is to be used for logic inference, classifications made by M may be explained by executing the symbolic approximation M' in parallel (as in the prior art). However, we now use M", not M', so as mentioned above the atoms used in the rules/explanations use labels assigned using the proposed kernel labelling process.

If it is noted during inference, using live or test images, that an image has been classified incorrectly by the trained CNN, then the CNN is retrained using further training images. In this case the rule associated with the incorrect classification is used to determine what features are to be shown in the further training images. In particular, since the rule indicates the features which led the associated kernels to activate, resulting in the misclassification of the image, retraining the CNN using more images showing the features concerned will help the retrained CNN to avoid such misclassification in future.

Figure 16:
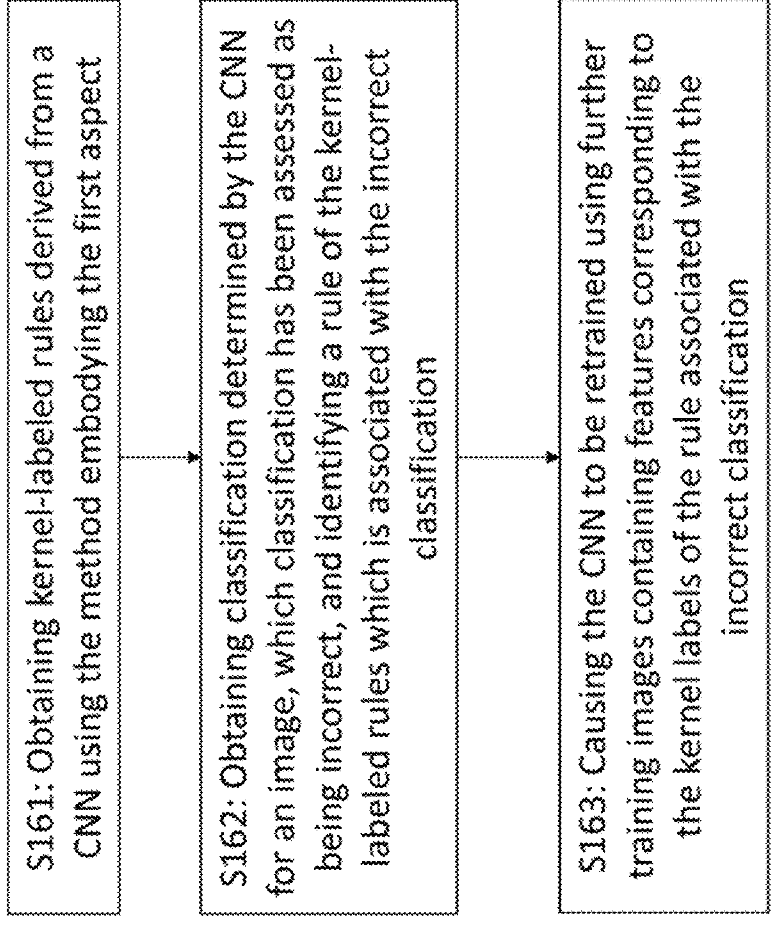
FIG. 16 is a flowchart of a method according to an embodiment.

In particular, as shown in the process of FIG. 16, training of an image classifier may be improved by, for a CNN trained to classify features in images, in step S161 obtaining kernel-labeled rules which have been derived from the CNN using a method according to an embodiment as described above, in step S162 obtaining, for at least one image not forming part of the training image dataset used to train the CNN or the feature-labeled image dataset used to derive the kernel-labeled rules, an incorrect classification of the at least one image determined by the CNN, and identifying a rule of the kernel-labeled rules which is associated with the incorrect classification, and in step S163 causing the CNN to be retrained using further training images containing features corresponding to the kernel labels of the rule associated with the incorrect classification.

Embodiments may be applied in any scenario where classifications are to be made using video data. One example would be CCTV security cameras for detecting security risks. These may need to be debugged if they yield false positives that lead innocent parties to being wrongly accused of a crime. Another application might be automated video tagging, i.e. to explain and diagnose incorrect tags.

A further application is to an Advanced Driver-Assistance System (ADAS). An ADAS is trained to recognise road scenes so that it may estimate local driving regulations if no traffic signs are visible and GPS connection has been lost (which would normally be used to retrieve local information). For example, in the UK if the ADAS recognises the local scene as a residential street in the UK, the safest assumption is a 30 mph speed limit. If it sees a motorway (highway), a 70 mph limit may be assumed. In the case of a school nearby, there is probably a 20 mph limit.

In the event that a scene is misclassified, there is a risk that a car could drive at an unsafe speed. For example, 70 mph in a residential street or 30 mph on a motorway are both hazardous. Thus, whether such instances are observed during development and testing, or by a user using the deployed system, these errors must be understood and corrected by the manufacturer.

Application to an ADAS of a method according to an embodiment will now be described.

Worked Example

CNN Training and Knowledge Extraction

The CNN is trained on a scene classification dataset (the problem dataset) and rules for explaining the CNN's classifications are extracted using the prior art method described with reference to FIG. 2 or similar. However, the extracted rules do not have labels assigned to the kernels. By default, the kernels are labeled with alphabetical letters as in FIG. 2. For example, a rule which identifies streets appears as G∧E→Street. The example presented in FIG. 2. will be used for the remainder of this scenario.

Kernel Labelling

A dataset of videos from fixed CCTV cameras is selected as the support dataset. The system iterates through each video, using differences between frames to support the labelling of kernels as described in the example below.

Note that since the extracted logic program M' does not include literals for D, H, I or L in this example, the corresponding kernels are excluded from the process and so we do not need to label them.

FIG. 8 illustrates 8 frames of a video taken by a CCTV camera, fixed on the side of a building by a road, and corresponding changes in kernel activations. Table 1 (FIG. 9) shows a presence matrix generated based on raw annotations of when objects enter and leave the scene. The following narrative explains annotation and kernel activation in parallel, though in practice it is assumed that the annotation matrix (Table 1, left) would have been completed before executing the extraction process.

- t=0: At the beginning of the video, a door, tree and some windows are already in view, so the annotator will have marked '1' under these headings in the 'raw annotation' matrix. Three kernels 'C', 'E' and 'J' are already active according to their magnitudes with respect to a global threshold, implying they are related to visible objects.
- t=1: A person emerges from the door, and so the annotator will have marked a '1' for 'person'. Although the door, tree and windows are still in view, there was no need to mark '1' for these again as the system assumes they are still present unless otherwise informed. This is reflected in the presence matrix (Table 1, right), generated automatically from the annotation matrix. One more kernel, 'G', has become active, suggesting a relationship to the person who entered the scene.
- t=2: The person has moved closer to the right of the camera view. Meanwhile, no further objects have entered or left the view and any changes in kernel activations are negligible.
- t=3: The person moves closer to the edge still but remains in view. A vehicle has entered the screen to the left, and the annotator has marked '1' to signify that this is a van entering the scene. Kernel 'A' has become active but only by a narrow margin.
- t=4: The person begins to disappear and the activation of kernel 'G' gets weaker (though nonetheless still active), further supporting the evidence that this kernel corresponds to people. More of the van appears in view as kernel A's activation gets stronger, suggesting correlation here also. Furthermore, the van occludes the tree and kernel D becomes inactive, suggesting that E responds to trees. The annotator marked '−1' for the 'Tree' label to indicate that it has disappeared and the 'Tree' column of the presence matrix from t=0 to t=3 was automatically populated with 1's.
- t=5: The person has now left the scene and kernel G is inactive again. The annotator marked '−1' under 'Person' to state they have disappeared and the 'Person' column of the presence matrix is populated with 1's from t=1 (when the person appeared) to t=4.
- t=6: The van is still in view but has passed the tree, which is no longer occluded. The annotator marked '1' under 'Tree' to indicate that it reappears in this frame, and kernel E is active again. Kernel A's activation has weakened as the van begins to exit the scene.
- t=7: The van has now exited the scene and so the annotator has marked '−1' under 'Van' to indicate as such. Kernel E is inactive again. The 'Van' column of the presence matrix for t=3 to t=6 (when the van appeared and disappeared respectively) is set to 1. Also, as this is the end of the video, presence matrix columns of all entities still visible were also populated with 1's: from t=1 to t=7 for the 'Door' and 'Window' (since these never disappeared) and from t=6 to t=7 for the 'Tree' (starting from when the Tree reappeared). Finally, note that the scene and kernel activations have all returned to their original states as seen for t=0.

This process is repeated for further training videos, with the annotator having only needed to mark when entities in the camera view appear or disappear. The presence or absence of these entities in all other frames were automatically filled into the presence matrix by the system.

Kernel Labelling (Segmentation-Based Alternative)

Figure 11:
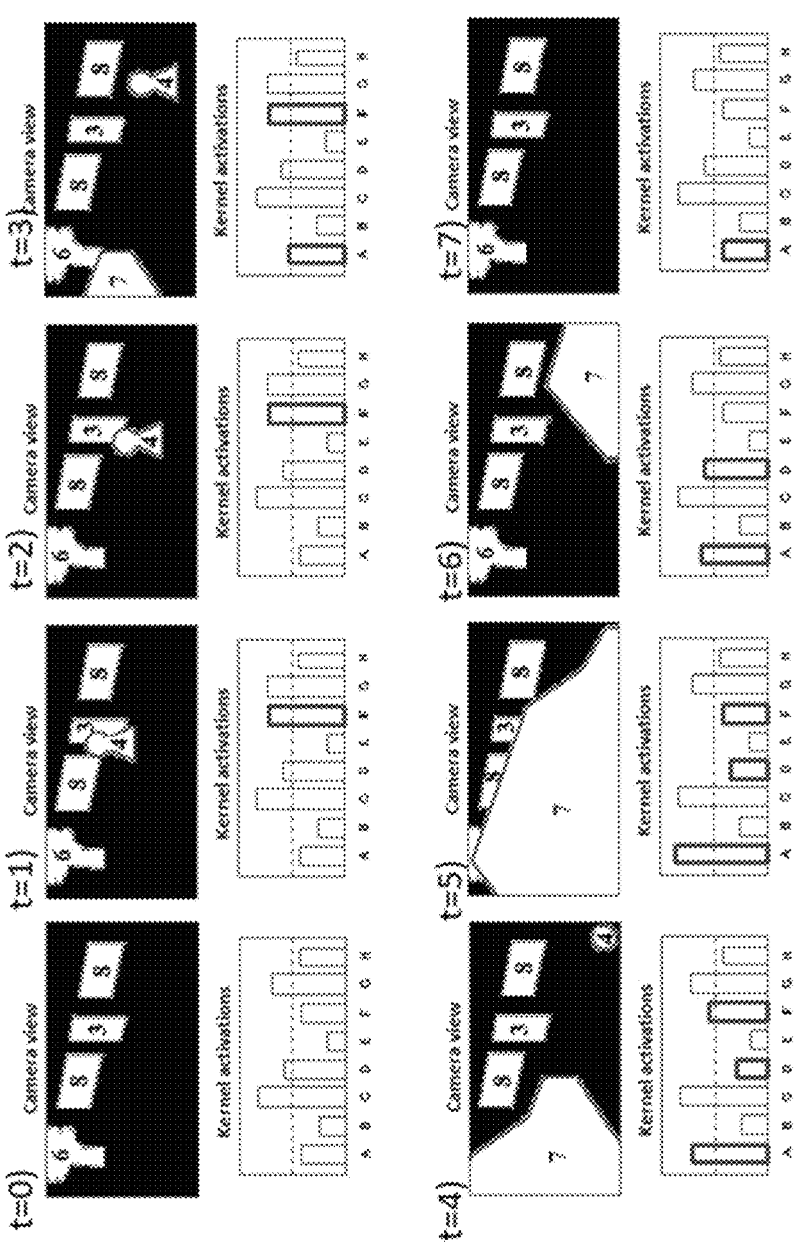
FIG. 11 is a diagram representing the series of still CCTV frames and associated kernel activations of FIG. 8, with segmented regions.

Alternatively, if segmentation annotations are available, the presence matrix could be filled with the total area (in pixels) taken up by segments of each class, and the kernel activation matrix filled with the activation values before quantisation. Values for the current example are shown in Table 3 (FIG. 12), based on segments shown in FIG. 11. In FIG. 11, each number in a segmented region corresponds to a different colour and therefore label. In Table 3 the presence and activation matrices are completed according to frame segmentations shown in FIG. 11. That is, each value of the presence matrix corresponds to the area occupied by the corresponding feature in the corresponding frame. For example, at t=4, the van (7) occupies 40 pixels.

Correlation Matrix

After all training videos have been observed, the Pearson Correlations between processed annotations and kernel activations are calculated as shown in Table 4 (FIG. 13). Maximum absolute values for each kernel are shown in bold, as each kernel will be assigned the label for which the absolute feature correlation is strongest. Each kernel is then assigned the label with which it has the strongest correlation according to this matrix. The rules of M' may now be interpreted as shown in Table 5 (FIG. 14).

Inference

Figure 15:
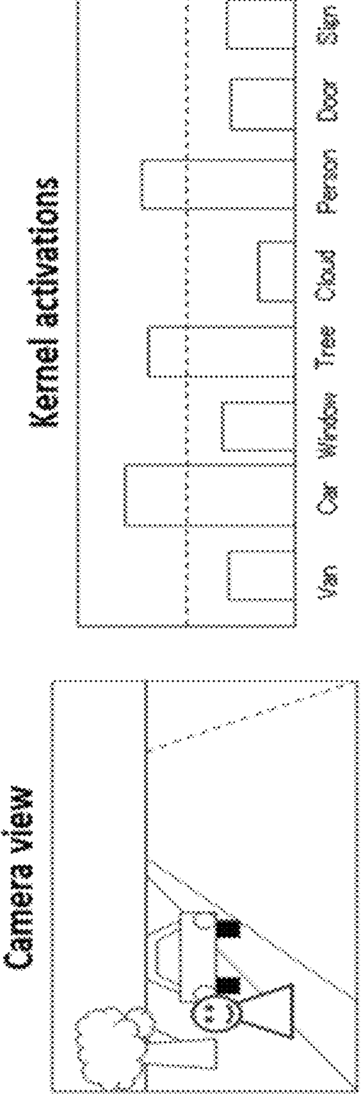
FIG. 15 is a diagram for use in explaining a misclassified image.

Later, after the trained and labeled ADAS software has been deployed in a car, a user is driving along a motorway (highway) only to discover the car is advising him to slow down because the car thinks he is in a residential street (see FIG. 15). In view of the camera is somebody broken down next to a tree, waiting outside their car for roadside assistance. The driver sees that the car has classified the scene as 'Street', and the explanation associated with this classification is Person ΛTree→Street, due to the presence of a person and a tree.

The user reports this error to the manufacturer, who upon inspecting the explanation accepts that the rule is an unreasonable assumption to make as it is highly likely that trees may be found by the roadside on the motorway, and although less likely, possible that people may be found stood by the motorway in scenarios such as this.

With this explanation, the developer knows that their model must be retrained with more examples of motorways in which humans are waiting by their cars, and/or trees may be found by the roadside.

Figure 17:
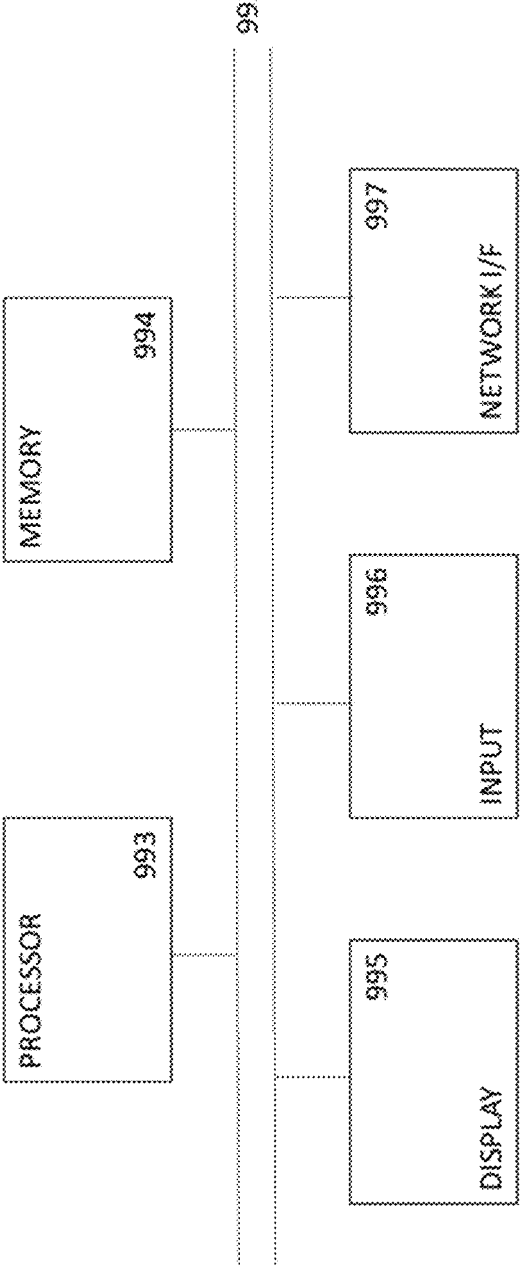
FIG. 17 is a block diagram of a computing device suitable for carrying out a method according to an embodiment.

FIG. 17 is a block diagram of a computing device, such as a data storage server, which embodies the present invention, and which may be used to implement some or all of the operations of a method embodying the present invention, and perform some or all of the tasks of apparatus of an embodiment. For example, the computing device of FIG. 17 may be used to implement some or all of the processes described with reference to FIG. 4, 5, 7 and/or 16.

The computing device comprises a processor 993 and memory 994. Optionally, the computing device also includes a network interface 997 for communication with other such computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to store information, such as the problem dataset, the support image dataset, kernel-labeled rules, misclassified images, and/or images used for retraining, and/or carry computer-executable instructions. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing some or all of the steps shown in FIG. 4, FIG. 5, FIG. 7, or FIG. 16, or for implementing one or more of the processes described with reference to FIG. 4 or FIG. 5 or FIG. 6 or FIG. 7 or FIG. 16. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIG. 4, FIG. 7 and/or FIG. 16 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device, such as images from the problem dataset, the support image dataset, misclassified images, and/or images used for retraining, and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 17. Such a computing device need not have every component illustrated in FIG. 17, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The invention can be implemented in digital electronic circuitry, or in computer hardware, firmware, software, or in combinations of them. The invention can be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites and interconnected by a communication network.

Method steps of the invention can be performed by one or more programmable processors executing a computer program to perform functions of the invention by operating on input data and generating output. Apparatus of the invention can be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The above-described embodiments of the present invention may advantageously be used independently of any other of the embodiments or in any feasible combination with one or more others of the embodiments.

Glossary of Terms Used in the Specification

- ADAS—Advanced Driver-Assistance System: A combination of software and hardware included in an automobile that assists the driver without taking full control of the vehicle.
- Feature attribution map (or 'feature importance map'): A heatmap over an image that has been classified by a CNN (or other method) which indicates the importance of each pixel in that image with respect to the output classification or with respect to the output activation(s) of some other component(s) of the classifier.
- Inpainting: A category of image-processing methods for automatically filling in missing image data with an estimation of the lost information, or replacing an entity in the image with an estimation of the background region it occludes.
- Perturbation-based feature attribution: A method of generating a feature attribution map by perturbing the input image and observing the change in output classification or activation of the component of interest.
- Presence Matrix: A term used to denote a table which represents what features or objects (columns) are present in which images/video frames (rows).
- Problem dataset: The dataset on which the CNN to be explained was originally trained. i.e. a dataset representing the problem domain for which the CNN is to be applied.
- Support dataset: A dataset used for the purpose of kernel labelling.

The invention claimed is:

1. A computer-implemented method of improving training of an image classifier, the method comprising:

for a convolutional neural network, CNN, trained to classify features in images, obtaining kernel-labeled rules;

for at least one image not forming part of a training image dataset used to train the CNN or a feature-labeled image dataset used to derive the kernel-labeled rules, obtaining a classification of the at least one image determined by the CNN, which classification has been assessed as being incorrect, and identifying a rule of the kernel-labeled rules which is associated with the incorrect classification; and causing the CNN to be retrained using further training images containing features corresponding to kernel labels of the rule associated with the incorrect classification, wherein the kernel-labeled rules have been derived from the CNN by:

obtaining the CNN trained to classify features in images using the training image dataset, extracting a logic program from the CNN, the logic program being a symbolic approximation of outputs of kernels at an extraction layer of the CNN, and deriving from the logic program rules which use the kernels to explain the classification of images by the CNN, obtaining the feature-labeled image dataset, and a record of each feature associated with each feature-labeled image in the feature-labeled image dataset, wherein the images in the feature-labeled image dataset include pairs of feature-labeled images, one feature-labeled image of the pair being of a scene containing a feature and the other feature-labeled image of the pair being of the same scene without the feature, forward-propagating the pairs of feature-labeled images through the logic program to obtain kernel activations at the extraction layer for features in the images, calculating a correlation between each kernel in the logic program and each feature in the feature-labeled images using the obtained kernel activations and the features associated with the feature-labeled images, assigning to each kernel in the logic program the label of the feature with which the kernel has the highest correlation, and applying the assigned kernel labels to the kernels in the derived rules to obtain the kernel-labeled rules.

2. A method as claimed in claim 1, wherein images in the feature-labeled image dataset include still frames from at least one video recording.

3. A method as claimed in claim 2, wherein the at least one video recording was captured by a closed-circuit television, CCTV, camera.

4. A method as claimed in claim 1, wherein the feature-labeled image dataset includes images annotated for semantic segmentation, and the record of each feature associated with each feature-labeled image in the feature-labeled image dataset includes a value corresponding to a total area occupied by the feature in the image.

5. A non-transitory computer-readable medium including instructions which, when executed by a computer, cause the computer to carry out the method of claim 1.

6. The method of claim 3, wherein the feature-labeled image dataset comprises images annotated for semantic segmentation, and the record of each feature associated with each feature-labeled image in the feature-labeled image dataset comprises a value corresponding to a total area occupied by the feature in the image.

7. Apparatus to improve training of an image classifier, the apparatus comprising:

at least one memory to store:

for a convolutional neural network, CNN, trained to classify features in images, kernel-labeled rules, and for at least one image not forming part of a training image dataset used to train the CNN or a feature-labeled image dataset used to derive the kernel-labeled rules, a classification of the at least one image determined by the CNN, which classification has been assessed as being incorrect; and at least one processor, connected to the at least one memory, to:

identify a rule of the kernel-labeled rules which is associated with the incorrect classification; and cause the CNN to be retrained using further training images containing features corresponding to kernel labels of the rule associated with the incorrect classification, wherein the kernel-labeled rules have been derived from the CNN using an apparatus comprising:

at least one memory to store (a) the CNN, trained to classify features in images using the a training image dataset, and (b) the feature-labeled image dataset and a record of each feature associated with each feature-labeled image in the feature-labeled image dataset, wherein the images in the feature-labeled image dataset include pairs of feature-labeled images, one feature-labeled image of the pair being of a scene containing a feature and the other feature-labeled image of the pair being of the same scene without the feature; and at least one processor, connected to the at least one memory, to:

extract a logic program from the CNN stored in the memory, the logic program being a symbolic approximation of outputs of kernels at an extraction layer of the CNN, and derive from the logic program rules which use the kernels to explain the classification of images by the CNN;

forward-propagate the pairs of feature-labeled images from the feature-labeled dataset stored in the memory through the logic program to obtain kernel activations at the extraction layer for features in the images; and calculate a correlation between each kernel in the logic program and each feature in the feature-labeled images using the obtained kernel activations and the features associated with the feature-labeled images;

assign to each kernel in the logic program the label of the feature with which the kernel has the highest correlation; and apply the assigned kernel labels to the kernels in the derived rules to obtain the kernel-labeled rules.

8. Apparatus as claimed in claim 7, wherein images in the feature-labeled image dataset include still frames from at least one video recording.

9. Apparatus as claimed in claim 8, wherein the at least one video recording was captured by a closed-circuit television, CCTV, camera.

10. Apparatus as claimed in claim 7, wherein the feature-labeled image dataset includes images annotated for semantic segmentation, and the record of each feature associated with each feature-labeled image in the feature-labeled image dataset includes a value corresponding to a total area occupied by the feature in the image.

11. The apparatus of claim 9, wherein the feature-labeled image dataset includes images annotated for semantic segmentation, and the record of each feature associated with each feature-labeled image in the feature-labeled image dataset includes a value corresponding to a total area occupied by the feature in the image.

12. A computer-implemented image classification method comprising:

obtaining a convolutional neural network, CNN, trained to classify features in images using a training image dataset;

extracting a logic program from the CNN, the logic program being a symbolic approximation of outputs of kernels at an extraction layer of the CNN, and deriving from the logic program rules which use the kernels to explain the classification of images by the CNN;

obtaining a feature-labeled image dataset, and a record of each feature associated with each feature-labeled image in the feature-labeled image dataset, wherein the images in the feature-labeled image dataset include pairs of feature-labeled images, one feature-labeled image of the pair being of a scene containing a feature and the other feature-labeled image of the pair being of the same scene without the feature;

forward-propagating the pairs of feature-labeled images through the logic program to obtain kernel activations at the extraction layer for features in the images:

calculating a correlation between each kernel in the logic program and each feature in the feature-labeled images using the obtained kernel activations and the features associated with the feature-labeled images;

assigning to each kernel in the logic program the label of the feature with which the kernel has the highest correlation; and applying the assigned kernel labels to the kernels in the derived rules to obtain kernel-labeled rules, wherein the method further comprises:

for at least one image not forming part of the training image dataset used to train the CNN or the feature-labeled image dataset used to derive the kernel-labeled rules, obtaining a classification of the at least one image determined by the CNN, which classification has been assessed as being incorrect, and identifying a rule of the kernel-labeled rules which is associated with the incorrect classification; and causing the CNN to be retrained using further training images containing features corresponding to the kernel labels of the rule associated with the incorrect classification.

13. A non-transitory computer-readable medium including instructions which, when executed by a computer, cause the computer to carry out the method of claim 12.

14. Image classification apparatus comprising:

at least one memory to store:

(a) a convolutional neural network, CNN, trained to classify features in images using a training image dataset, and (b) a feature-labeled image dataset and a record of each feature associated with each feature-labeled image in the feature-labeled image dataset, wherein the images in the feature-labeled image dataset include pairs of feature-labeled images, one feature-labeled image of the pair being of a scene containing a feature and the other feature-labeled image of the pair being of the same scene without the feature; and at least one processor, connected to the memory, to:

extract a logic program from the CNN stored in the memory, the logic program being a symbolic approximation of outputs of kernels at an extraction layer of the CNN, and derive from the logic program rules which use the kernels to explain the classification of images by the CNN:

forward-propagate the pairs of feature-labeled images from the feature- labeled dataset stored in the memory through the logic program to obtain kernel activations at the extraction layer for features in the images; and calculate a correlation between each kernel in the logic program and each feature in the feature-labeled images using the obtained kernel activations and the features associated with the feature-labeled images;

assign to each kernel in the logic program the label of the feature with which the kernel has the highest correlation; and apply the assigned kernel labels to the kernels in the derived rules to obtain kernel-labeled rules, wherein the at least one processor is further configured to:

for at least one image not forming part of the training image dataset used to train the CNN or the feature-labeled image dataset used to derive the kernel-labeled rules, obtain a classification of the at least one image determined by the CNN, which classification has been assessed as being incorrect, and identify a rule of the kernel-labeled rules which is associated with the incorrect classification; and cause the CNN to be retrained using further training images containing features corresponding to the kernel labels of the rule associated with the incorrect classification.

* * * * *